March 28, 1961 B. SIENKIEWICZ ET AL 2,977,203
AGGLOMERATING PROCESS
Filed Aug. 27, 1958
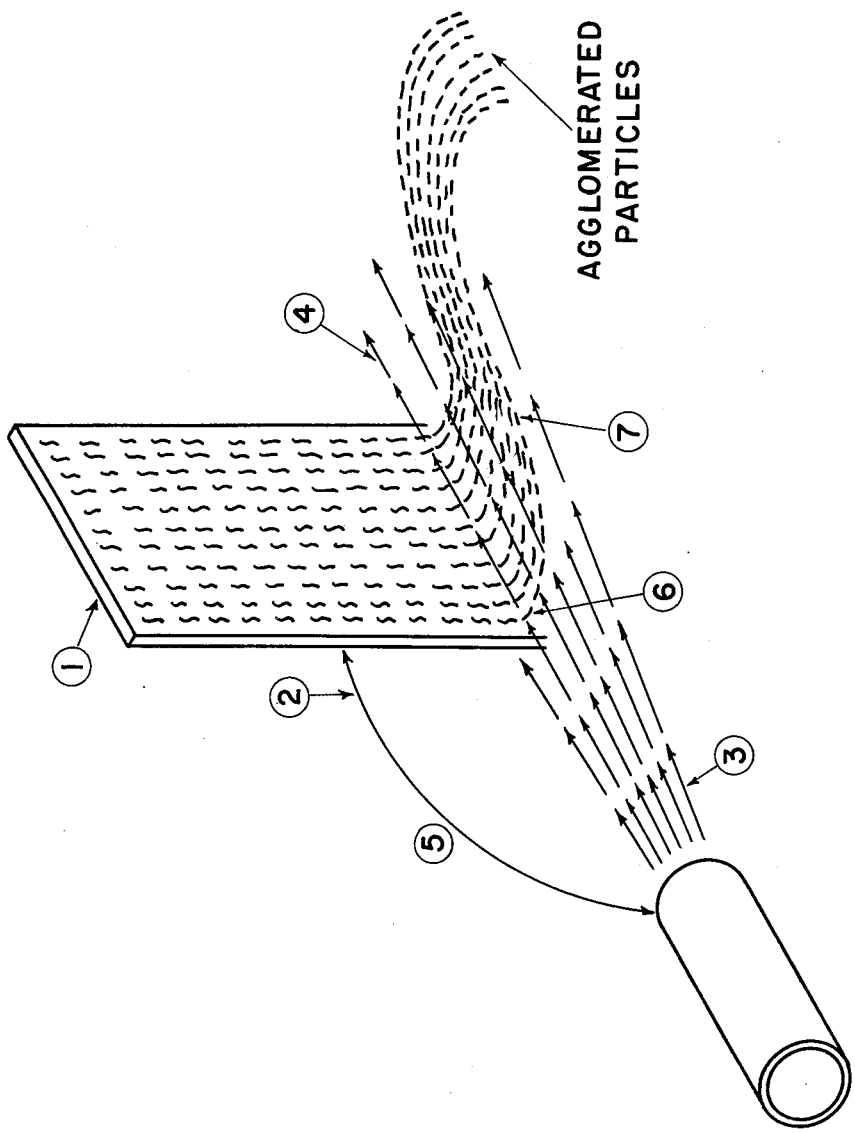
INVENTORS
BOLESLAW SIENKIEWICZ
RICHARD B. KOHLER
MARVIN SCHULMAN

United States Patent Office 2,977,203
Patented Mar. 28, 1961

2,977,203
AGGLOMERATING PROCESS

Boleslaw Sienkiewicz, Pearl River, Richard B. Kohler, Riverdale, and Marvin Schulman, Brooklyn, N.Y., assignors to General Foods Corporation, White Plains, N.Y., a corporation of Delaware Filed Aug. 27, 1958, Ser. No. 757,443

3 Claims. (Cl. 23—313)

This invention relates to the agglomeration of powders. In particular the invention relates to the production of agglomerates of food powders such as soluble coffe powder and like beverage powders as well as other powdered food substances like gelatin, pectin, and confectionery powders generally.

Agglomeration of powders is being practiced today in the food industry to improve the performance of various water soluble food products. By means of agglomeration, powders which would ordinarily clump and float on the surface of liquids, will become instantized by virtue of the tendency of agglomerates to sink in a body of liquid and break up whereby they demonstrate improved dispersibility and greater solubility in cold water, milk and the like. Heretofore, steam has been employed to wet particles of foods in powdered form whereby the particles can be agglomerated through intimate contact of the wetted particles as they strike one another. In general, such practices have involved the formation of a stream of product to which is introduced jets of steam at an angle to the direction of travel of the powder. Thereafter, agglomeration occurs through the turbulent action which is created by virtue of the angle of incidence of the steam to the powder as well as the consequent redirection and collision of powders.

While such prior practices offer improvements in the agglomeration of powder they leave much to be desired in more than one respect. In the first place, agglomerating procedures employing steam to wet the powder material have not provided the degree of yield of agglomerates desired such that there is required in most cases a subsequent classification step wherein unagglomerated powder is recovered and recycled for agglomeration. It would be desirable to have an agglomeration process which provides a very high yield of agglomerates such that the foregoing classification and recycling steps can be substantially eliminated.

In many powdery food products such as soluble coffee and coffee-like beverage powders noted for their solubility and ease of preparation, it is desirable to provide such powders in a darkened condition. Here too it would be desirable to employ a process which darkens the product while at the same time provides a high yield for the reasons indicated above. Dried soluble coffee extract generally has a moisture content in the order of 3% by weight. In providing a robust appearance to the dried soluble extract the provision of a product having a moisture content ranging up to 3% and above would be desired. The problem of providing this high moisture content during the agglomeration process is compounded by difficulty in agglomerating the dried powdery extract in such a way as to offer satisfactory yield. Generally, it has been the experience that the yield of agglomerates suffers when attempts have been made to increase the moisture content upwardly and thereby darken the product.

It also becomes important, in agglomerating powdery products such as soluble coffee, not only to increase moisture content and thereby darken the beverage powder, but also to avoid such an increase as will introduce the problem of lumping or caking upon agglomeration.

Agglomeration has also been employed in the past as a procedure for introducing a carrier or dispersing medium with respect to a product such as gelatin, pectin, algin and other gums or colloids. By inter-mixing gelatinous hydrophilic or other colloidal material with sugars such as lactose, sucrose, dextrose and mixtures thereof to provide an agglomerate, the product demonstrates improved dispersion and in turn improved solubility and appearance. The factor of uniform density is also to be considered and the technique of agglomeration has been employed to insure uniform density of material. Here again, yield considerations play a significant part in the suitability of the agglomerating process for, with improved degree of agglomeration, i.e., increased percentage of agglomerates formed, there is corresponding uniformity of product density.

In addition, most of the steam agglomerating procedures of the prior art require a subsequent drying step since, in order to recover the product in a non-tacky condition, it is generally required that substantial moisture be evaporated from the product. Otherwise, the agglomerate will tend to plaster the walls of the collecting chamber and lump. It would be desirable to have an agglomerating process wherein drying equipment and the accompanying capital expense involved as well as the operating expense of heat supply is eliminated.

The drawing is a side view showing applicants' invention. More specifically, a plane of discretely arranged powder particles is formed (1). The plane of powder particles is then moved in a first direction (2). A jet of steam (3) is introduced to the plane of powder particles to wet them sufficiently so that they are capable of adhering to one another when they contact each other. The jet of steam travels in a path (4) substantially coinciding with the plane of said powder particles and is disposed at a substantial angle (5) to said first direction. The steam jet has a force sufficient to redirect the particles in said plane (6) and project them while in said plane in the path of travel of the steam. The wetter powder particles carried in the path of steam are caused to contact one another and agglomerate (7).

In accordance with the present invention an improved agglomerating procedure is provided by forming a plane of discretely arranged powder particles moving in a first direction, preferably in the form of a falling curtain. The word "curtain" refers to a substantially planar distribution of product. A jet of steam is introduced at an angle substantially normal to the direction of travel of the curtain of product and may range generally from an angle of 45° to an angle of 135° with respect to the direction of travel of the product, the path of the jet of steam being substantially in the plane of the curtain of product such that the particles are redirected by the steam jet and wet; in this way the particles are redirected in a single stream substantially coinciding with the path of the steam jet and more or less concentrated with respect to the locus of that jet for a long period of time as the particles travel therealong. Thus, as the particles in the curtain enter the path of the jet of steam they immediately become wetted and by being directed in the path of the steam jet are caused to contact one another such that by virtue of the prolonged period wherein they are provided the opportunity for contact or collision, a greater percentage of agglomeration is experienced. The force of the steam jet can be adjusted so as to get utilization of the agglomeration process consistent with the properties of the product being agglomerated but, in any event, the jet should have a force sufficient to redirect the particles in the curtain and to maintain and project the particles in a unitary pencil-form path over a prolonged period of time such that the maximal opportunity for collison or contact of the wetted particles is afforded. On the other hand, the force of the steam jet should be below that point at which turbulence renders it impossible for the particles to be redirected and collide in a single unitary path coinciding with the zone of influence of the steam jet. The curtain of powdery product should be introduced to the steam jet in as thin and as wide a stream as practical in order that the particles are sufficiently separated one from another and can be independently redirected and bombarded with respect to one another in their wetted condition thereby effecting agglomeration. Thus, the particles should be sufficiently discretely separated one from the other in a narrow plane or sheet and be disposed with respect to the direction of the steam jet in such fashion as to be effectively redirected into a thin pencil-form stream wherein substantially all of the particles are confined as they are projected after being wetted. The inner diameter of the steam pipe should be substantially greater than the thickness of the curtain of material. In general, it has been found that a steam pipe having an inner diameter of ½ to 1 inch may be employed to agglomerate a curtain of product ranging in thickness from as thin a stream as can possibly be curtained up to ¼ inch.

The curtain of material should be disposed with respect to the outlet of the steam jet in such fashion that the force of the steam is effectively utilized in order to redirect and agglomerate the wetted particles in a pencil-like stream; when the curtain of material is disposed at too great a distance from the origin of the steam jet the force of the steam will be spent and the efficiency of the operation will be correspondingly decreased. The separation between the jet and the edge of the curtain proximate the steam jet will in large measure be determined by the velocity of the steam as well as the width of the curtain. For curtains of substantial widths it will generally be found practical to locate the proximate edge of the curtain as close as possible to the jet of steam. In addition, the width of the curtain should not be above that at which the effect of the steam jet cannot be fully realized without sacrificing a yield of agglomerates.

In accordance with the present invention the foregoing curtain of powdery material can be created by any one of a number of means. The powder can be introduced into the steam jet from a vibrating conveyor or belt conveyor which introduces the product in the form of a cascade. Or, the product can be introduced from a hopper provided with a suitably elongated thin narrow slit through which the product may issue into the path of a jet of steam. In lieu of a single steam jet a plurality of steam jets may be employed with the appropriate number of powder streams feeding a corresponding number of jets.

With respect to the steam source, the degree of wetness of the steam used will be to some extent dependent upon the type of product being agglomerated. Likewise, the pressure of the steam will be a function of the force of steam required which in turn is dependent upon the type of curtain of material being introduced thereto. In general, steam having a line pressure in the order of 15 p.s.i.g. has been found to offer satisfactory force for the purpose of redirection and agglomeration. The scope of the invention is not to be limited to any specific steam pressure since many factors must be taken into account to achieve efficient agglomeration, viz., the size of the orifice issuing the steam jet, the relationship of orifice size to the thickness of the curtain, the distance of the curtain from the orifice, the width and thinness of the curtain, the rate at which product is being fed to the steam jet, and the density of the individual powders being agglomerated. In general, wet or dry steam may be employed. In the case of dry steam the cooling which will be experienced as the steam is introduced to the curtain will cause condensation of the moisture around the particles to wet them and thereby effect agglomeration. However, it is generally desirable to use a wet steam in order to use a lower ratio of steam to powder. Then too, the product itself will dictate to some extent the temperature of the steam introduced. For many products which tend to be fused by high temperatures and melt or become tacky and cause subsequent collection problems, it will be desirable to employ a temperature below the fusion temperature of the product, all of which practices can be followed and understood by the man skilled in the art.

The invention will now be more fully understood by reference to the accompanying examples:

(1) The dried and powdered water extract of a beverage roast comprising bran, molasses and barley and having the bulk density listed below was fed from a chute about 5″ wide in the form of a curtain $\frac{1}{16}$–⅛″ thick at a rate of approximately 45 lbs. per hour; the chute had an angle of inclination of 60° with respect to the horizontal. A jet of steam was continuously introduced to the falling sheet-like curtain of powder by means of a ½″ inner diameter pipe, the orifice of the pipe being located about 1″ below the edge of the powder-feeding chute and 1″ away from the edge of the curtain produced by the chute. The steam jet was disposed at an angle of approximately 90° with respect to the direction of travel of the powder in the curtain and was located in the plane of travel of the product. The steam was saturated, had a pressure range between 15–30 p.s.i.g. and was introduced to the falling curtain at a rate of approximately 30 lbs. of steam per hour. The falling particles in the curtain were projected in the path of the steam jet by the force of the steam in the plane of the curtain and were displaced from the curtain a distance ranging from 2″–3′ onto a belt conveyer. The agglomerated product was not dried but was allowed to cool and set on the conveyor for about two minutes prior to collection. The properties of the beverage powder prior to agglomeration were as follows:

| Particle Size Distribution | | Bulk Density, Gm./cc. | Moisture | Color |
|---|---|---|---|---|
| US Screen Size | Percent Through Screen | | | |
| #80 | 93.5 | 0.56 | 4.3% by weight | Light. |
| #120 | 78.5 | | | |

The properties of the agglomerated product were as follows:

| Particle Size Distribution | | Bulk Density, Gm./cc. | Moisture | Color |
|---|---|---|---|---|
| US Screen Size | Percent Through Screen | | | |
| #25 | 53 | 0.12 | 6.2% by weight | Dark. |
| #70 | 13 | | | |
| #100 | 6 | | | |

The agglomerated product was found to dissolve in cold water or milk in about ¼ of the time required for unagglomerated powder. For instance, the beverage powder prior to agglomeration required about 4 to 4½ minutes to be dissolved in cold milk, whereas only one minute was required in the case of the agglomerated product. The robust appearance of the product was considerably enhanced by the darkening in color occurring upon agglomeration. The agglomerated product had a structural strength permitting it to be readily handled without substantial break-up into fines when subjected to normal filling and packaging operations.

(2) A coffee surrogate was prepared by autoclaving a mixture of barley, corn syrup and starch in a hydrous reaction mixture at an elevated temperature until flavor was produced. The supernatant liquid was recovered and was dried and ground. The ground product has an initial bulk density of 0.47 gm./cc.; the powder was light brown in color. The powder was agglomerated in apparatus substantially the same as that of Example 1 except that a ¾" orifice was employed to provide the steam jet and the product was fed at a rate of 30 pounds per hour, the steam pressure being the same as that in Example 1 and the steam rate being in the order of 30 pounds per hour. The product prior to agglomeration had the following particle size distribution:

| Particle Size Distribution | | Bulk Density, Gm./cc. | Moisture | Color |
| --- | --- | --- | --- | --- |
| US Screen Size | Percent Through Screen | | | |
| #70 | 100 | 0.47 | 1½% by weight. | Light Brown. |
| #120 | 90 | | | |

The product after agglomeration had the following particle size distribution:

| Particle Size Distribution | | Bulk Density, Gm./cc. | Moisture | Color |
| --- | --- | --- | --- | --- |
| US Screen Size | Percent Through Screen | | | |
| #50 | 25 | 0.14 | 3% by weight. | Dark Brown. |
| #70 | 5 | | | |

3. Soluble coffee powder was agglomerated under the conditions of Example 2 and in the apparatus of Example 2. The unagglomerated coffee had the following particle size distribution:

| Particle Size Distribution | | Bulk Density, Gm./cc. | Moisture | Color |
| --- | --- | --- | --- | --- |
| US Screen Size | Percent Through Screen | | | |
| #70 | 100 | 0.52 | 2% by weight. | Medium Brown. |
| #120 | 96 | | | |
| #200 | 80 | | | |

The agglomerated powder has the following particle size distribution:

| Particle Size Distribution | | Bulk Density, Gm./cc. | Moisture | Color |
| --- | --- | --- | --- | --- |
| US Screen Size | Percent Through Screen | | | |
| #50 | 15.4 | 0.23 | 3.5% by weight. | Dark Brown. |
| #70 | 6.0 | | | |
| #120 | 4.4 | | | |

4. Gelatin powder of a size such that 100% passed a #60 U.S. Standard Mesh Screen and having a bulk density of 0.62 gm./cc. was agglomerated in the apparatus and under the conditions of Example 2. The agglomerated product had the following particle size distribution:

| Particle Size Distribution | | Bulk Density, Gm./cc. | Moisture |
| --- | --- | --- | --- |
| US Screen Size | Percent Through Screen | | |
| #7 | 90 | 0.27 | 3% by weight. |

Although the invention has been more particularly described with respect to the food products wherein certain virtues such as appearance, uniformity of particle size, solubility and yield have been most prominent, other non-food products may equally lend themselves to agglomeration by the method of the present invention. For example, inorganic fertilizers which normally have a high percentage of diluent in order to effect more uniform distribution of the fertilizer and easier handling by the average user lend themselves notably to this particular procedure. The process provides a very clean, free-flowing, dust-free quality which will permit both the skilled and unskilled handler of the product to properly distribute the fertilizer. In addition, there are other arts where the agglomeration process of the present invention may be employed. Many pharmaceuticals employ a diluent and are presently tableted and can be equally benefited by the improved yield and uniformity of agglomeration achieved herein. In general, industrial chemicals and metals in which: (a) it is desirable to alter the particle size; or (b) wherein decreasing the dusting which takes place in handling particles of a very fine size and pulverulent character is sought; or (c) where it is desirable to alter the density to a more useable state, will benefit from the present invention.

While the present invention has been described with particular reference to specific examples, it is not to be limited thereby, but reference is to be had to the appended claims for a definition of its scope.

What is claimed is:

1. The process of agglomerating powder which comprises forming a plane of discretely arranged powder particles moving in said plane in a first direction, introducing a jet of steam to said plane to wet the particles therein sufficiently so that they are capable of adhering to one another when they contact one another, said steam jet traveling in a path substantially coinciding with the plane of said particles and being disposed at a substantial angle to said first direction, said steam jet having a force sufficient to redirect said particles in said plane and project them while in said plane in the path of travel of the steam whereby wetted particles are caused to contact one another and agglomerate.

2. The process of agglomerating powder which comprises forming a plane of discretely arranged powder particles moving in said plane in a first direction, introducing a jet of steam to said plane to wet the particles therein sufficiently so that they are capable of adhering to one another when they contact one another, said steam jet traveling in a path substantially coinciding with the plane of said particles and being disposed at an angle substantially normal to said first direction, said steam jet having a force sufficient to redirect said particles in said plane and project them while in said plane in the path of travel of the steam whereby wetted particles are caused to contact one another and agglomerate.

3. The process of agglomerating powder which comprises forming a falling substantially flat curtain of discretely arranged powder particles moving in said plane in a first direction, introducing a jet of steam to said curtain to wet the particles therein sufficiently so that they are capable of adhering to one another when they contact one another, said steam jet traveling in a path substantially coinciding with the plane of said curtain and being disposed at an angle substantially normal to said first direction, said steam jet having a force sufficient to redirect said particles in said curtain and project them while in said curtain in the path of travel of the steam whereby wetted particles are caused to contact one another and agglomerate.

References Cited in the file of this patent

UNITED STATES PATENTS 2,785,455   McElroy _____ Mar. 19, 1957